(12) United States Patent
Darak et al.

(10) Patent No.: US 11,132,442 B1
(45) Date of Patent: Sep. 28, 2021

(54) SYSTEMS AND METHODS FOR ENFORCING SECURE SHARED ACCESS ON COMPUTING DEVICES BY CONTEXT PINNING

(71) Applicant: Symantec Corporation, Mountain View, CA (US)

(72) Inventors: Anand Darak, Pune (IN); Sudhir Kumar, Bihar (IN)

(73) Assignee: NortonLifeLock Inc., Tempe, AZ (US)

(*) Notice: Subject to any disclaimer, the term of this patent is extended or adjusted under 35 U.S.C. 154(b) by 289 days.

(21) Appl. No.: 16/351,323

(22) Filed: Mar. 12, 2019

(51) Int. Cl.
G06F 21/55 (2013.01)
G06F 21/52 (2013.01)

(52) U.S. Cl.
CPC ............ G06F 21/554 (2013.01); G06F 21/52 (2013.01); *G06F 2221/033* (2013.01); *G06F 2221/034* (2013.01)

(58) Field of Classification Search
CPC .. G06F 21/554; G06F 21/52; G06F 2221/033; G06F 2221/034
See application file for complete search history.

(56) References Cited

U.S. PATENT DOCUMENTS

| | | | |
|---|---|---|---|
| 10,395,029 B1* | 8/2019 | Steinberg | G06F 9/45541 |
| 10,726,127 B1* | 7/2020 | Steinberg | G06F 21/629 |
| 2019/0347420 A1* | 11/2019 | Schultz | G06F 9/4406 |
| 2020/0389460 A1* | 12/2020 | Carbune | G06F 21/629 |
| 2021/0019414 A1* | 1/2021 | Vijayvargiya | G06F 9/45558 |

* cited by examiner

Primary Examiner — Christopher A Revak
(74) Attorney, Agent, or Firm — FisherBroyles, LLP (57) ABSTRACT

The disclosed computer-implemented method for enforcing secure shared access on computing devices by context pinning may include recording, on the computing device, one or more actions performed on one or more applications, determining, based on the recorded actions and applications, a context that defines permitted actions and applications for a guest user of the computing device, monitoring, based on the context, user activity on the computing device, detecting an activity that violates the context, and performing, in response to the detection, a security action. Various other methods, systems, and computer-readable media are also disclosed.

20 Claims, 7 Drawing Sheets

| Record ID | Event Type | Package Name |
|---|---|---|
| 001 | WINDOW_STATE_CHANGED | com.DocViewer |
| 002 | VIEW_SCROLLED | com.DocViewer |
| 003 | PRINT_JOB | com.printservice |

| Record ID | Action | Application |
|---|---|---|
| 001 | Open document | DocViewer |
| 002 | View document | DocViewer |
| 003 | Print document | system |

SYSTEMS AND METHODS FOR ENFORCING SECURE SHARED ACCESS ON COMPUTING DEVICES BY CONTEXT PINNING

BACKGROUND

Computing devices have become smaller and portable, and mobile devices such as smartphones are increasingly available and commonplace. Smartphone users often let others borrow their smartphone for quick tasks, such as opening and printing documents, checking messages, making phone calls, web browsing, viewing media, etc. However, when users simply hand over their smartphones to guest users, the smartphones may be susceptible to security threats and/or other unwanted activity. Guest users may be able to intentionally or unintentionally gain access to sensitive data on the smartphones.

Conventionally, a user may set up a guest user account, with limited authorization and permission, for guest users to use the user's computing device. However, setting up a guest user account may be time-consuming, particularly for short tasks. Moreover, many users may not know how to set up a guest user account, may not be aware of guest user accounts, or may not wish to be bothered to do so. Other conventional solutions may include restricting access to specific applications and/or files. However, such conventional solutions may not be flexible, as some applications may allow more or less functionality than what the user may wish to grant to a guest user.

The present disclosure, therefore, identifies and addresses a need for systems and methods for enforcing secure shared access on computing devices by context pinning.

SUMMARY

As will be described in greater detail below, the present disclosure describes various systems and methods for enforcing secure shared access on computing devices by context pinning.

In one example, a method for enforcing secure shared access on computing devices by context pinning may include (a) recording, on the computing device, one or more actions performed on one or more applications, (b) determining, based on the recorded actions and applications, a context that defines permitted actions and applications for a guest user of the computing device, (c) monitoring, based on the context, user activity on the computing device, (d) detecting an activity that violates the context, and (e) performing, in response to the detection, a security action.

In some examples, the security action may comprise at least one of locking the computing device, disabling the computing device, preventing the activity that violates the context from completing, and presenting a warning. In some examples, recording the one or more actions may comprise recording at least one of screen metadata, container metadata, dialogue names, content change events, and state change events. In some examples, recording the one or more actions may comprise recording mutation events based on monitoring an accessibility service event of an operating system (OS) of the computing device.

In some examples, the context may comprise a permit table of permitted mutation events. Monitoring user activity may further comprise detecting a mutation event based on the user activity. Detecting activity that violates the context may further comprise determining that the mutation event is absent from the permit table.

In some examples, recording the one or more actions may further comprises (1) presenting a floating widget, (2) receiving a first indication, via the floating widget, to begin recording user activity, and (3) receiving a second indication, via the floating widget, to cease recording.

In some examples, determining the context may further comprise incorporating a whitelist of permitted actions and applications. In some examples, the method may further comprise storing the context in a local database.

In one embodiment, a system for enforcing secure shared access on computing devices by context pinning may include at least one physical processor and physical memory that includes computer-executable instructions that, when executed by the physical processor, cause the physical processor to (a) record, on the computing device, one or more actions performed on one or more applications, (b) determine, based on the recorded actions and applications, a context that defines permitted actions and applications for a guest user of the computing device, (c) monitor, based on the context, user activity on the computing device, (d) detect an activity that violates the context, and (e) perform, in response to the detection, a security action.

In some examples, the security action may comprise at least one of locking the computing device, disabling the computing device, preventing the activity that violates the context from completing, and presenting a warning. In some examples, the instructions for recording the one or more actions may comprise instructions for recording at least one of screen metadata, container metadata, dialogue names, content change events, and state change events. In some examples, the instructions for recording the one or more actions may comprise instructions for recording mutation events based on monitoring an accessibility service event of an operating system of the computing device.

In some examples, the context may comprise a permit table of permitted mutation events. The instructions for monitoring user activity may further comprise instructions for detecting a mutation event based on the user activity. The instructions for detecting activity that violates the context may further comprise instructions for determining that the mutation event is absent from the permit table.

In some examples, the instructions for recording the one or more actions may further comprise instructions for (1) presenting a floating widget, (2) receiving a first indication, via the floating widget, to begin recording user activity, and (3) receiving a second indication, via the floating widget, to cease recording. In some examples, the context may comprise a whitelist of permitted actions and applications, and the context may be stored in a local database.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (a) record, on the computing device, one or more actions performed on one or more applications, (b) determine, based on the recorded actions and applications, a context that defines permitted actions and applications for a guest user of the computing device, (c) monitor, based on the context, user activity on the computing device, (d) detect an activity that violates the context, and (3) perform, in response to the detection, a security action.

In some examples, the security action may comprise at least one of locking the computing device, disabling the computing device, preventing the activity that violates the context from completing, and presenting a warning. In some examples, the instructions for recording the one or more actions may comprise instructions for recording at least one of screen metadata, container metadata, dialogue names, content change events, and state change events. In some examples, the instructions for recording the one or more actions may comprise instructions for recording mutation events based on monitoring an accessibility service event of an operating system of the computing device.

In some examples, the context may comprise a permit table of permitted mutation events. The instructions for monitoring user activity may further comprise instructions for detecting a mutation event based on the user activity. The instructions for detecting activity that violates the context may further comprise instructions for determining that the mutation event is absent from the permit table.

In some examples, the instructions for recording the one or more actions may further comprise instructions for (1) presenting a floating widget, (2) receiving a first indication, via the floating widget, to begin recording user activity, and (3) receiving a second indication, via the floating widget, to cease recording. In some examples, the context may comprise a whitelist of permitted actions and applications, and the context may be stored in a local database.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for enforcing secure shared access on computing devices by context pinning. As will be explained in greater detail below, a user of a computing device may establish a context by recording permitted actions and/or applications for the context. The user may then enable a context pinning mode on the computing device which allows a guest user to perform actions on applications which are permitted in the context. The guest user's activity may be monitored using services already available on the computing device's operating system. If the guest user performs any actions or uses any applications which are not in the context, the computing device may perform a security action such as locking the computing device. The user may therefore be able to establish a customized context for allowing the guest user specific limited access to the computing device for particular tasks suited for the context. For example, as user may be able to share his or her mobile device without having to explicitly blacklist certain applications and/or files. Other conventional security tools may not allow flexibility and may be restricted to permitting access only to one specified application or file. Moreover, conventional security tools may not allow the user to further restrict actions within the specified application. Thus, the systems and methods described herein may be able to provide secure and flexible guest access to the computing device without requiring an extensive setup procedure.

In addition, the systems and methods described herein may improve the functioning of a computing device by providing a flexible activity monitor without requiring significant additional computing resources or complicated configurations. These systems and methods may also improve the field of computer security by leveraging services which may already be available on the operating system of the computing device to prevent unauthorized access.

Figure 1:
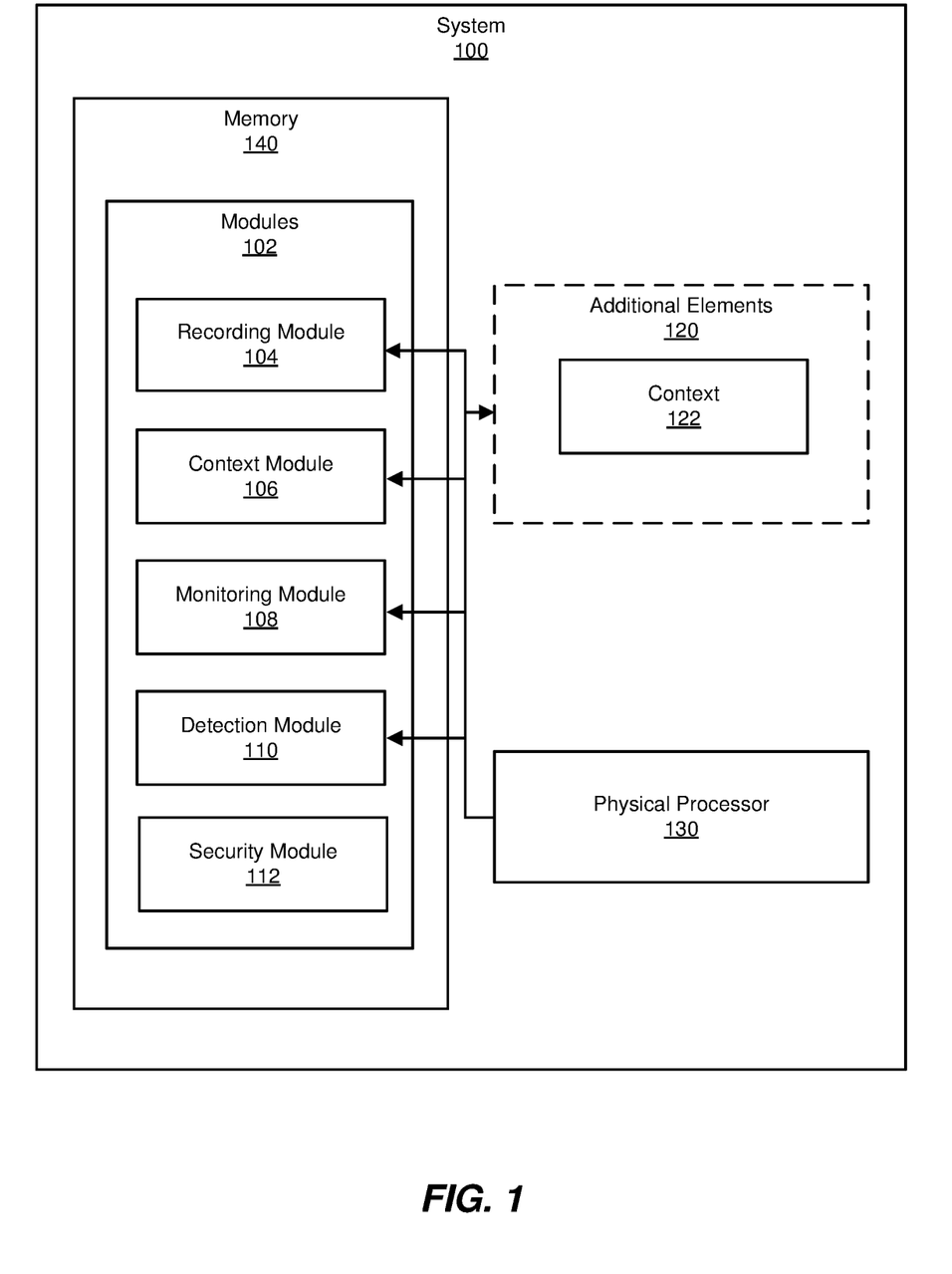
FIG. 1 is a block diagram of an example system for enforcing secure shared access on computing devices by context pinning.
Figure 2:
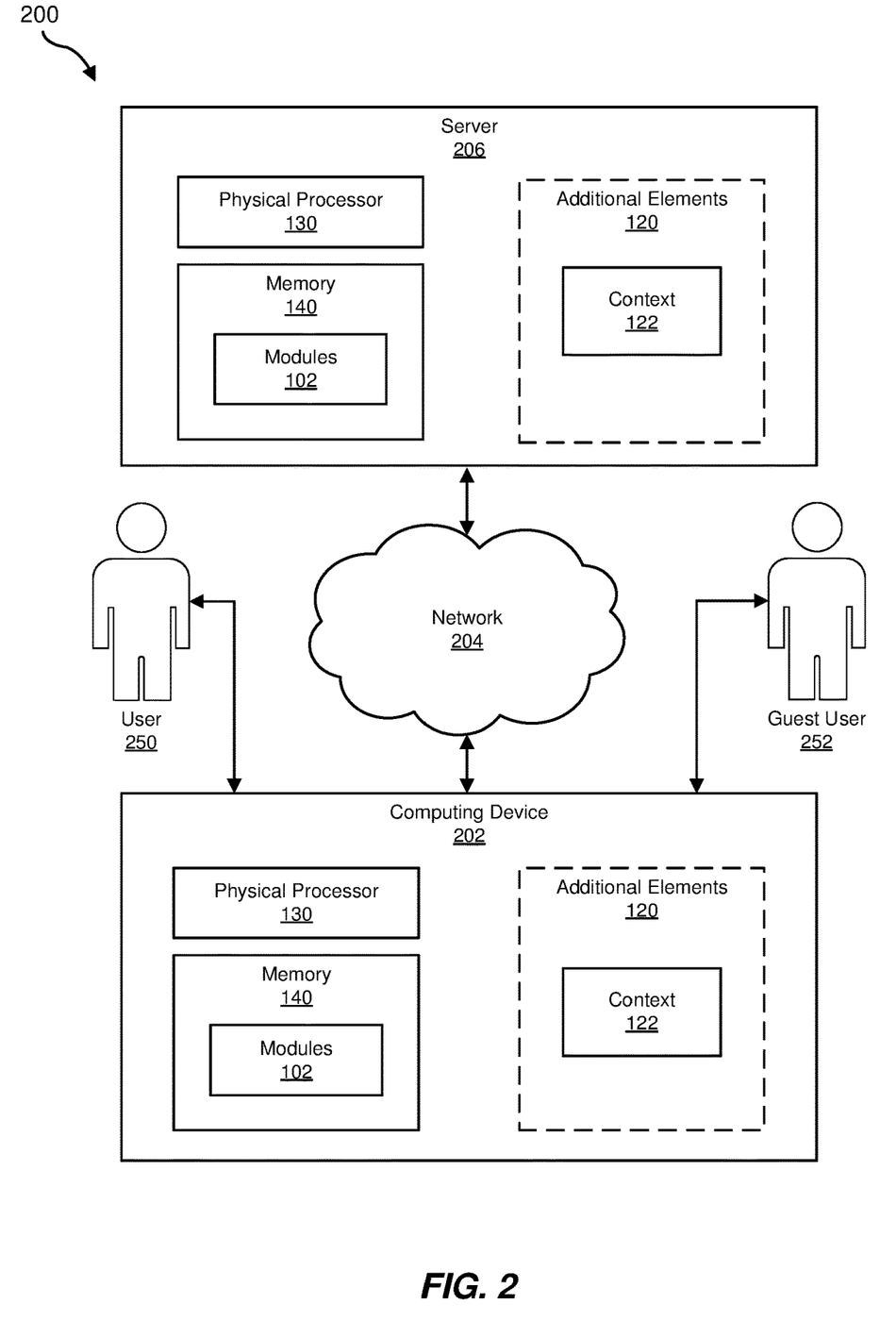
FIG. 2 is a block diagram of an additional example system for enforcing secure shared access on computing devices by context pinning.

The following will provide, with reference to FIGS. 1-2, detailed descriptions of example systems for enforcing secure shared access on computing devices by context pinning. Detailed descriptions of corresponding computer-implemented methods will also be provided in connection with FIG. 3. Detailed descriptions of an example widget for context pinning will be provided in connection with FIG. 4. Detailed descriptions of permit tables for contexts will be provided in connection with FIGS. 5A-5B. In addition, detailed descriptions of an example computing system and network architecture capable of implementing one or more of the embodiments described herein will be provided in connection with FIGS. 6 and 7, respectively.

The term "context," as used herein, generally refers to a usage environment for performing certain tasks a computing device. A context may be represented by a permit table and/or whitelist of permitted actions and/or applications on the computing device. Examples of contexts include, without limitation, printing documents, viewing and/or sending messages, web browsing, making a phone call, etc. For instance, a printing document context may include a document viewer application and access to printer functions.

The term "context pinning," as used herein, generally refers to restricting access to a computing device in accordance with the context. When in a context pinning mode, the computing device may be restricted to permitted actions and/or applications such that a guest user of the computing device may be limited to only the context. For instance, in the printing document context, the guest user may only be able to use a document viewer application and send print commands to a specified printer connected to the computing device.

FIG. 1 is a block diagram of an example system 100 for enforcing secure shared access on computing devices by context pinning. As illustrated in this figure, example system 100 may include one or more modules 102 for performing one or more tasks. As will be explained in greater detail below, modules 102 may include a recording module 104, a context module 106, a monitoring module 108, a detection module 110, and a security module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing secure shared access on computing devices by context pinning. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a context 122. Context 122 generally represents any type or form of enumerated permitted actions and/or applications when context 122 is active. In one example, context 122 may comprise a permit table and/or whitelist.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to enforce secure shared access on computing device 202 via context pinning. For example, and as will be described in greater detail below, one or more of modules 102 may cause computing device 202 and/or server 206 to recite steps of method claim using FIG. 2

Computing device 202 generally represents any type or form of computing device capable of reading computer-executable instructions. Computing device 202 may be a mobile device such as a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. Computing device 202 may include (e.g., locally store in memory 140) context 122.

Computing device 202 may be accessed and used by a user 250 and a guest user 252. User 250 may be a normal user of computing device 202 such that user 250 may have access and/or permission to many or all functions of computing device 202. For example, user 250 may be an owner or otherwise regular user of computing device 202. Guest user 252 may be a guest user of computing device 202 who may not normally access and/or use computing device 202. For instance, user 250 may physically lend computing device 202 to guest user 252 for use in a specific context.

Server 206 generally represents any type or form of computing device that is capable of receiving, storing, and/or sending data. Server 206 may be a backend server. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. Server 206 may include (e.g., locally store in memory 140) context 122. In some implementations, computing device 202 may retrieve context 122 from server 206. In other implementations, computing device 202 may locally generate context 122 such that server 206 may be optional.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
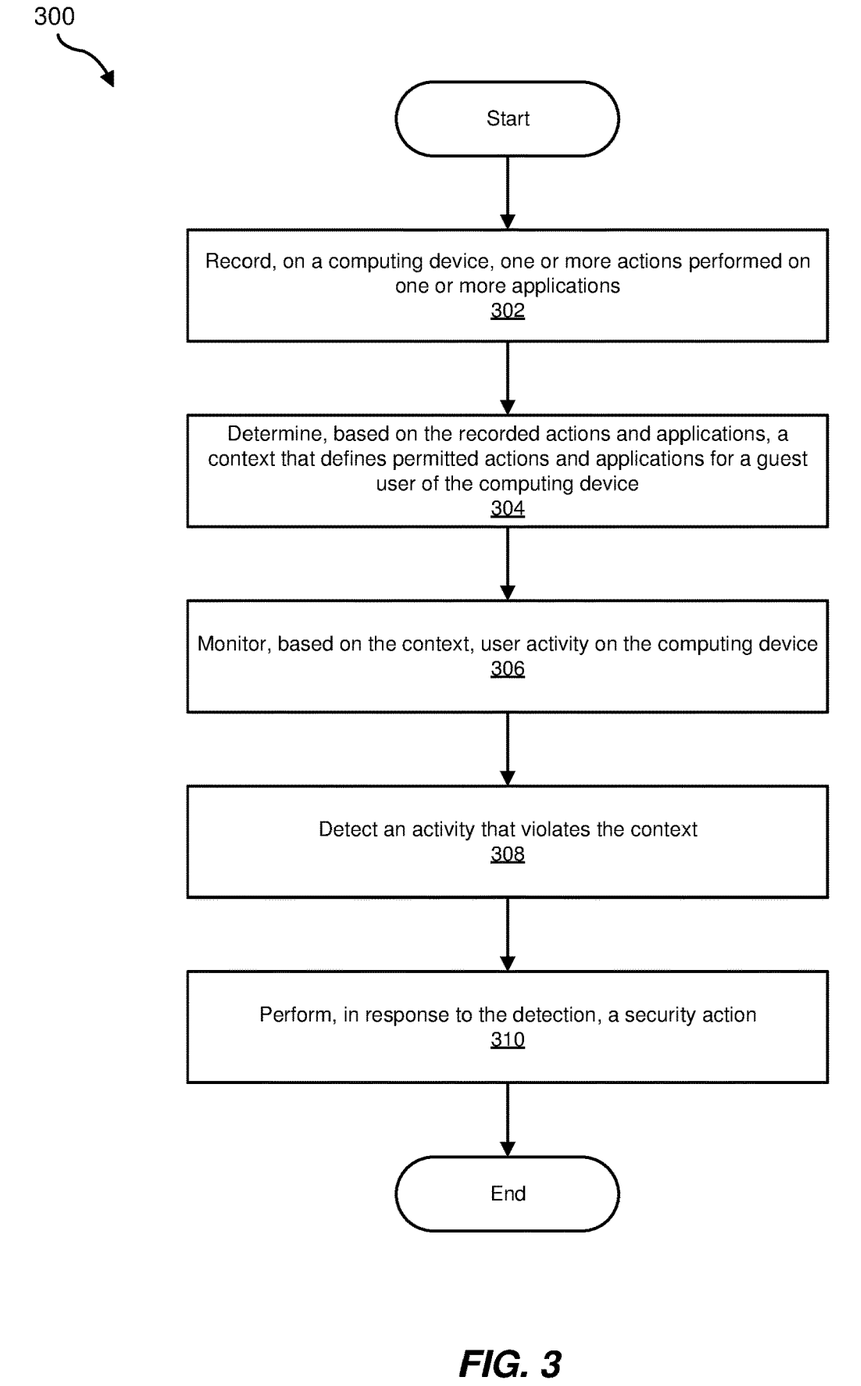
FIG. 3 is a flow diagram of an example method for enforcing secure shared access on computing devices by context pinning.

FIG. 3 is a flow diagram of an example computer-implemented method 300 for enforcing secure shared access on computing devices by context pinning. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may record, on the computing device, one or more actions performed on one or more applications. For example, recording module 104 may, as part of computing device 202 in FIG. 2, record user 250 performing actions using applications on computing device 202.

The systems described herein may perform step 302 in a variety of ways. In one example, recording the one or more actions may include presenting a floating widget, receiving a first indication, via the floating widget, to begin recording user activity, and receiving a second indication, via the floating widget, to cease recording.

Figure 4:
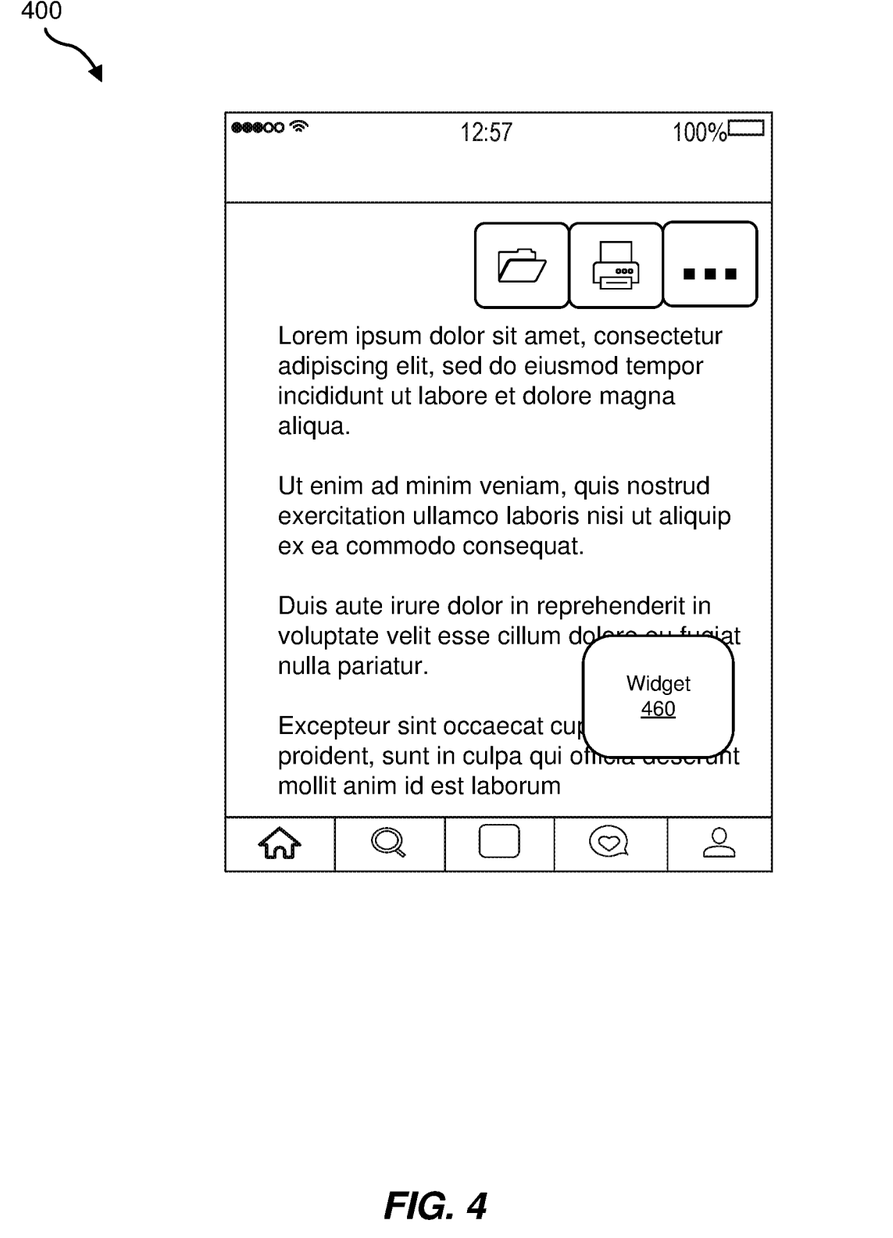
FIG. 4 is an example screenshot of a computing device with an example widget for enforcing secure shared access on computing devices by context pinning.

FIG. 4 illustrates an example screen 400 of a mobile device, such as computing device 202. A widget 460 may be displayed on screen 400 to facilitate recording actions for defining contexts. Widget 460 may be a floating widget in that widget 460 may be overlaid on other content displayed on screen 400. Widget 460 may provide user interface (UI) elements, such as buttons, to start and stop recording, prompts to alert user 250 and/or guest user 252 (e.g., that recording has started and/or stopped, that the context is ready, and/or that context pinning mode is enabled). Widget 460 may remain visible throughout method 300 to serve as a visual indicator of context pinning mode. In some implementations, widget 460 may be partially or completely hidden, or may be minimized by user 250.

In one example, user 250 may wish to establish a context for viewing and printing a document. User 250 may, via widget 460, start recording. User 250 may then perform actions for the context. For instance, user 250 may open the document using an application, view the application (e.g., scroll through the document), and print the document by sending a print job to a connected printer. User 250 may then cease recording.

In some implementations, recording the one or more actions may comprise recording at least one of screen metadata, container metadata, dialogue names, content change events, and state change events. The metadata may be made available via an operating system of the computing device. More specifically, an accessibility service of the operating system may provide the metadata. In some implementations, recording the one or more actions may comprise recording mutation events based on monitoring an accessibility service event of an operating system of the computing device.

Figure 5A:
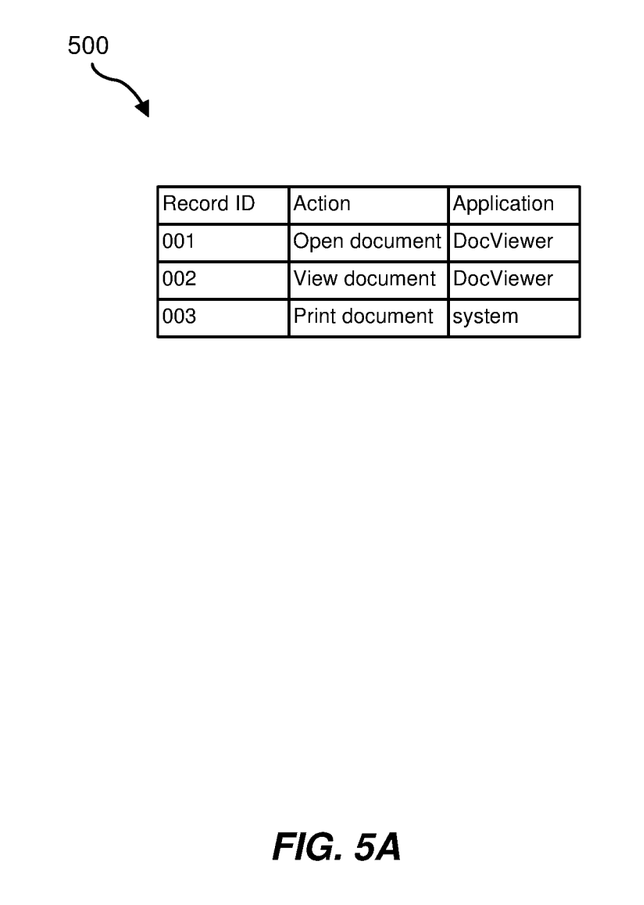
FIGS. 5A and 5B are example permit tables for contexts.
Figure 5B:
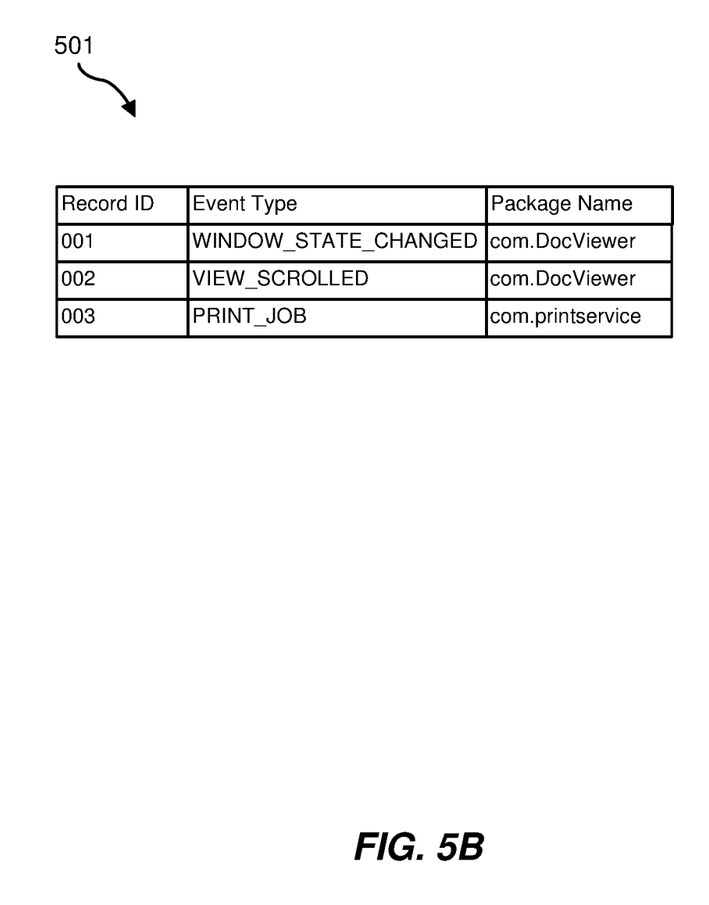

The recorded actions and/or applications may be stored locally, for instance in a table saved in memory 140 of computing device 202. FIG. 5 illustrates a table 500 and a table 501. Tables 500 and 501 may correspond to the printing document context described above. Table 501 may include, for each recorded entry, an action that user 250 performed and the application used. As seen in table 500, user 250 may have opened a document using a DocViewer application (record ID 001), viewed the document (record ID 002), and then sent a print command for the document (record ID 003). In other implementations, the actions and/or applications may be recorded and saved in other formats, such as other data formats using other descriptors or metadata.

Table 501 illustrates a variation of table 500. In table 501, the actions and/or applications may be recorded using metadata from the operating system of computing device 202. For instance, an accessibility service of the operating system may provide mutation events and corresponding metadata when user 250 performs actions on computing device 202. As seen in table 501, the specific metadata from the accessibility service, such as event type and package name, may be saved. Event type may correspond to mutation events which indicate a change which the operating system may detect, such as a change in content to be displayed, UI events, user inputs, etc. Package name may correspond to applications, services, etc. which may enable, perform, or otherwise affected by the mutation event. User 250 opening the document may be detected and recorded as an event type of "WINDOW_STATE_CHANGED," via package "com.DocViewer." User 250 viewing the document may be detected and recorded as an event type of "VIEW_S-CROLLED," via package "com.DocViewer." User 250 printing (e.g., sending a print job to a connected printer) the document may be detected and recorded as an event type of "PRINT_JOB," via package "com.printservice."

Returning to FIG. 3, at step 304 one or more of the systems described herein may determine, based on the recorded actions and applications, a context that defines permitted actions and applications for a guest user of the computing device. For example, context module 106 may, as part of computing device 202 in FIG. 2, determine context 122 from the actions and applications recorded at step 302.

The systems described herein may perform step 304 in a variety of ways. In one example, the context may comprise a whitelist of permitted actions and applications. Table 500 may correspond to a whitelist. In another example, the context may comprise a permit table of permitted mutation events. Table 501 may correspond to a permit table of permitted mutation events.

In some implementations, the permitted actions may be generalized such that certain analogous resources may be accessible even if not explicitly recorded. For example, user 250 may have printed to a specific printer. The context may allow access to other connected printers, rather than the specific printer that user 250 used. In addition, actions and applications may not be explicitly linked such that the permitted actions may be permissible on all permitted applications.

The context may be stored in a local database, such as a database stored in memory 140 of computing device 202. In some implementations, the context may be deleted once the current context pinning session ends. In other implementations, the context may be stored and retrieved for future context pinning sessions involving the same context. In addition, the context may be stored remotely, such as in memory 140 of server 206. In such implementations, contexts stored on server 206 may be available to other computing devices.

Ending the recording of actions and determining the context may initiate a context pinning session. User 250 may hand over computing device 202 to guest user 252 to allow guest user 252 to use computing device 202 for performing tasks within the scope of the established context.

As illustrated in FIG. 3, at step 306 one or more of the systems described herein may monitor, based on the context, user activity on the computing device. For example, monitoring module 108 may, as part of computing device 202 in FIG. 2, monitor user activity of guest user 252 using computing device 202.

The systems described herein may perform step 306 in a variety of ways. In one example, monitoring user activity may comprise detecting a mutation event based on the user activity. For example, as guest user 252 uses computing device 202, the mutation events may be detected, similar to how the activity of user 250 was previously recorded. The operating system of computing device 202, more specifically the accessibility service, may provide the mutation events.

As illustrated in FIG. 3, at step 308 one or more of the systems described herein may detect an activity that violates the context. For example, detection module 110 may, as part of computing device 202 in FIG. 2, detect an action by guest user 252 on computing device 202 that violates context 122.

The systems described herein may perform step 308 in a variety of ways. In one example, detecting activity that violates the context further may comprise determining that the mutation event is absent from the permit table. For instance, any mutation events that are not explicitly stored in the permit table may indicate activity that violates the context.

In the document printing context example, guest user 252 may open and view a document using DocViewer. Based on tables 500 and/or 501, opening and viewing the document using DocViewer may be permitted. Guest user 252 may then attempt to edit and/or save the opened document. Based on tables 500 and/or 501, editing and/or saving the document may not be permitted.

In some implementations, detected mutation events may be considered permitted if there is an exact match in the permit table. In some implementations, detected mutation events may be considered permitted if there is a matching class or type in the permit table. In some implementations, a class or type of the detected mutation event may determine how strong of a match is required to be considered permitted activity.

As illustrated in FIG. 3, at step 310 one or more of the systems described herein may perform, in response to the detection, a security action. For example, security module 112 may, as part of computing device 202 in FIG. 2, perform a security action in response to guest user 252 violating context 122.

The term "security action," as used herein, generally refers to remedial and/or preventative action to address known and/or possible security threats. Examples of include, without limitation, quarantining malicious code, preventing unauthorized access, and notifying administrators.

The systems described herein may perform step 310 in a variety of ways. In one example, the security action may include one or more of locking the computing device, disabling the computing device, preventing the activity that violates the context from completing, and presenting a warning. Locking the computing device may be performed using normal operating system functions to prevent further use of the computing device until a user unlocks (e.g., logs in with a valid user account) the computing device. Disabling the computing device may include disabling functionality of the computing device using specialized software, such as security software, which may or may not be a normal part of the operating system. Preventing the activity from completing may include disabling the application, canceling commands, sending false completion results to the application, etc. Presenting a warning may include sending the user a notification and/or displaying warning messages.

In the document printing context example, computing device 202 may detect that guest user 252 attempted editing and saving the open document in violation of context 122. In response to the violation, computing device 202 may lock itself to prevent the violating action from completing and to prevent further violations of context 122. Computing device 202 may require unlocking by user 250 in order to use computing device 202.

In some implementations, performing the security action may end the context pinning mode of computing device 202. For example, widget 460 may close in response to or as part of the security action. Alternatively, if no activity violating context 122 is detected, user 250 and/or guest user 252 may end, via widget 460, the context pinning mode. In some implementations, the context pinning mode may end automatically after a pre-determined amount of time or in response to another trigger, such as computing device 202 automatically locking itself due to inactivity.

As explained above in connection with example method 300, a user may allow a guest user to borrow the user's mobile device in order to perform a specific task, such as printing a document, checking messages, viewing media, etc. Rather than setting up a guest account or using other security tools which may not provide enough flexibility (e.g., the restrictions may permit too many or not enough actions that the user may wish to permit), the user may establish a context for the specific task. The user may record his or her own actions in performing the task to establish the context. The user's actions may include using one or more applications and performing certain actions within the one or more applications. Because the user is recording his or her own actions, establishing the context may be intuitive for the user and the user may not require administrative knowledge of the mobile device to configure permissions or other security settings. Thus, the context may include only the actions and/or applications that the user recorded such that any applications or actions (including actions which may be available in a permitted application) that were not explicitly recorded by the user may not be considered permitted within the scope of the context.

A widget on the display of the mobile device may facilitate the recording and subsequent context pinning. The widget may provide UI elements as well as a visual indicator of the context pinning mode. Once the user establishes the context, the context pinning mode may be enabled on the mobile device and the user may hand over the mobile device to a guest user. The guest user may then perform permitted actions based on the context. If the guest user attempts an action outside the scope of the context, the mobile device may lock. Once the guest user finishes using the mobile device, for instance by completing the task or being locked out due to unauthorized actions, the guest user may return the mobile device to the user. The user may then end the context pinning mode and/or unlock the device as needed to resume normal use. The context pinning may allow the user to easily and intuitively understand what actions and/or applications are permitted, allows flexible definition of contexts, and may provide secure shared access to the user's mobile device.

Figure 6:
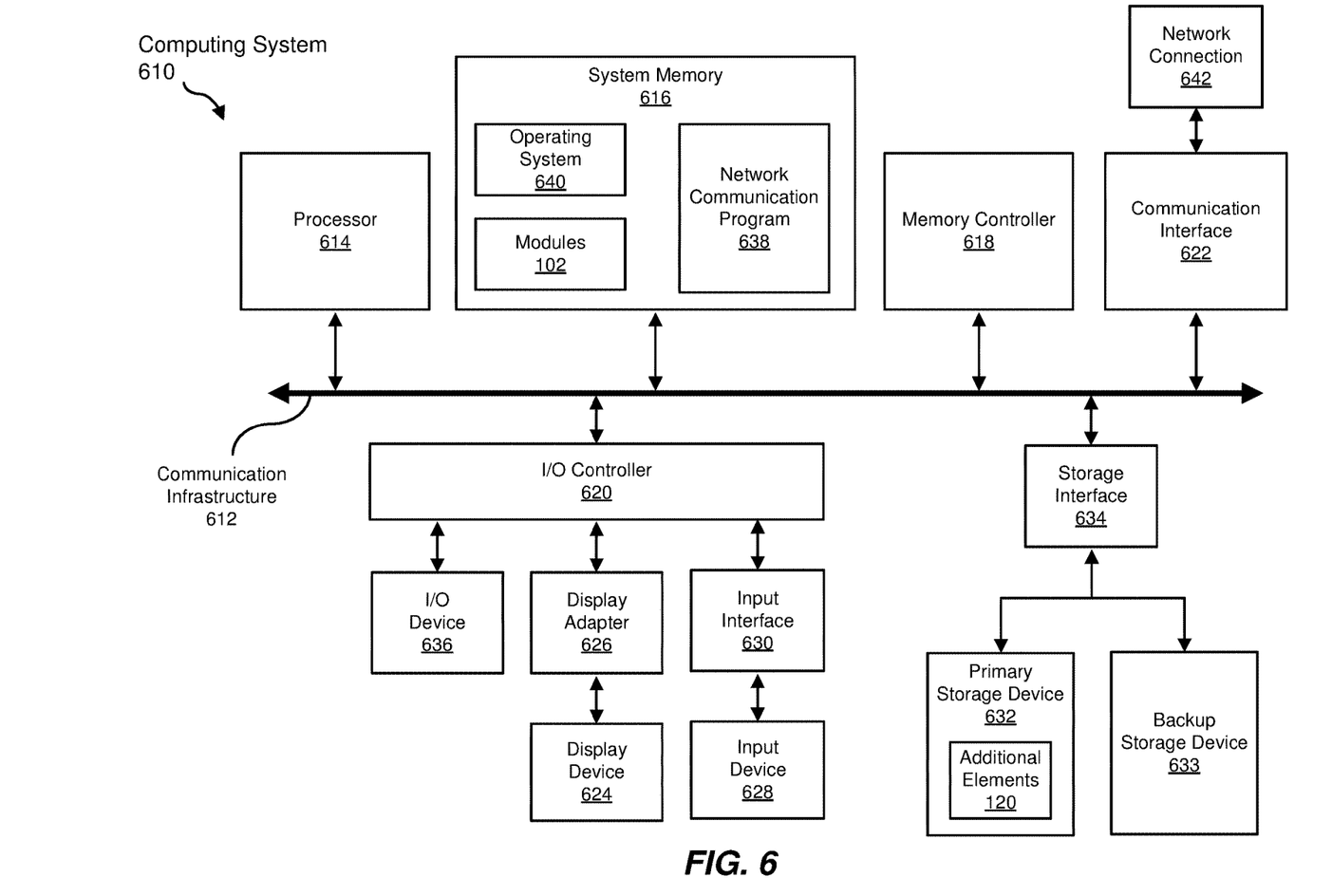
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120, such as context 122, from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
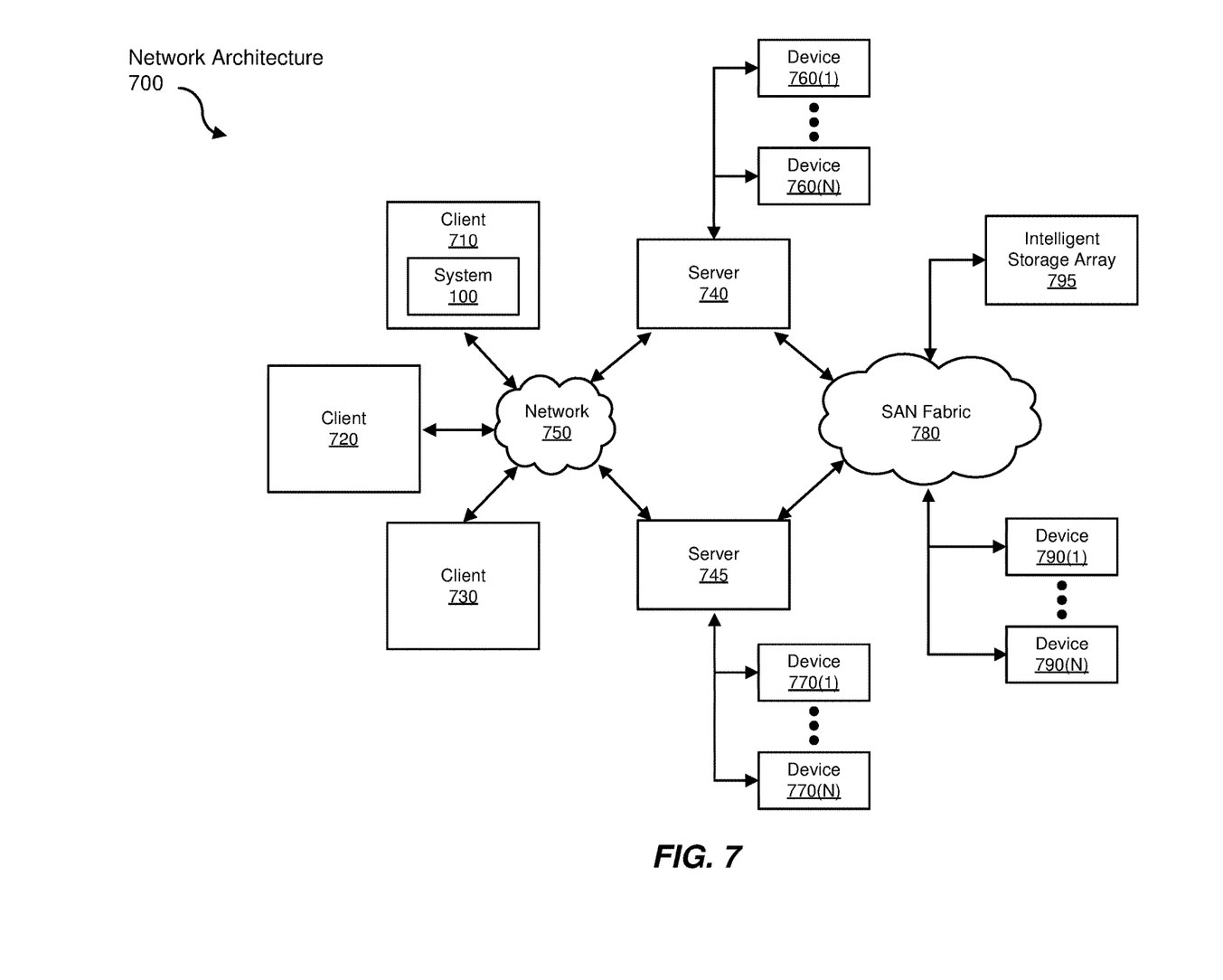
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing secure shared access on computing devices by context pinning.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive accessibility service data to be transformed, transform the data into a permit table, store the result of the transformation as a context, and user the result of the transformation to monitor for unauthorized activity on a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing secure shared access on computing devices by context pinning, at least a portion of the method being performed by a computing device comprising at least one processor, the method comprising:
　　recording, on the computing device, one or more actions performed on one or more applications;
　　establishing a context that defines permitted actions and applications for a guest user of the computing device by defining the permitted actions and applications from the recorded actions and applications;
　　enabling, based on the established context, a context pinning mode on the computing device;
　　monitoring, based on the context, user activity on the computing device;
　　detecting an activity that violates the context; and
　　performing, in response to the detection, a security action.

2. The method of claim 1, wherein the security action comprises at least one of locking the computing device, disabling the computing device, preventing the activity that violates the context from completing, and presenting a warning.

3. The method of claim 1, wherein recording the one or more actions comprises recording at least one of screen metadata, container metadata, dialogue names, content change events, and state change events.

4. The method of claim 1, wherein recording the one or more actions comprises recording mutation events based on monitoring an accessibility service event of an operating system of the computing device.

5. The method of claim 1,
　　wherein the context comprises a permit table of permitted mutation events;
　　wherein monitoring user activity further comprises detecting a mutation event based on the user activity; and
　　wherein detecting activity that violates the context further comprises determining that the mutation event is absent from the permit table.

6. The method of claim 1, wherein recording the one or more actions further comprises:
presenting a floating widget;
receiving a first indication, via the floating widget, to begin recording user activity; and
receiving a second indication, via the floating widget, to cease recording.

7. The method of claim 1, wherein determining the context further comprises incorporating a whitelist of permitted actions and applications.

8. The method of claim 1, further comprising storing the context in a local database.

9. A system for enforcing secure shared access on computing devices by context pinning, the system comprising:
at least one physical processor;
physical memory comprising computer-executable instructions that, when executed by the physical processor, cause the physical processor to:
record, on a computing device, one or more actions performed on one or more applications;
establish a context that defines permitted actions and applications for a guest user of the computing device by defining the permitted actions and applications from the recorded actions and applications;
enable, based on the established context, a context pinning mode on the computing device;
monitor, based on the context, user activity on the computing device;
detect an activity that violates the context; and
perform, in response to the detection, a security action.

10. The system of claim 9, wherein the security action comprises at least one of locking the computing device, disabling the computing device, preventing the activity that violates the context from completing, and presenting a warning.

11. The system of claim 9, wherein the instructions for recording the one or more actions comprise instructions for recording at least one of screen metadata, container metadata, dialogue names, content change events, and state change events.

12. The system of claim 9, wherein the instructions for recording the one or more actions comprise instructions for recording mutation events based on monitoring an accessibility service event of an operating system of the computing device.

13. The system of claim 9,
wherein the context comprises a permit table of permitted mutation events;
wherein the instructions for monitoring user activity further comprise instructions for detecting a mutation event based on the user activity; and
wherein the instructions for detecting activity that violates the context further comprise instructions for determining that the mutation event is absent from the permit table.

14. The system of claim 9, wherein the instructions for recording the one or more actions further comprise instructions for:
presenting a floating widget;
receiving a first indication, via the floating widget, to begin recording user activity; and
receiving a second indication, via the floating widget, to cease recording.

15. A non-transitory computer-readable medium comprising one or more computer-executable instructions that, when executed by at least one processor of a computing device, cause the computing device to:
record, on the computing device, one or more actions performed on one or more applications;
establish a context that defines permitted actions and applications for a guest user of the computing device by defining the permitted actions and applications from the recorded actions and applications;
enable, based on the established context, a context pinning mode on the computing device;
monitor, based on the context, user activity on the computing device;
detect an activity that violates the context; and
perform, in response to the detection, a security action.

16. The non-transitory computer-readable medium of claim 15, wherein the security action comprises at least one of locking the computing device, disabling the computing device, preventing the activity that violates the context from completing, and presenting a warning.

17. The non-transitory computer-readable medium of claim 15, wherein the instructions for recording the one or more actions comprise instructions for recording at least one of screen metadata, container metadata, dialogue names, content change events, and state change events.

18. The non-transitory computer-readable medium of claim 15, wherein the instructions for recording the one or more actions comprise instructions for recording mutation events based on monitoring an accessibility service event of an operating system of the computing device.

19. The non-transitory computer-readable medium of claim 15,
wherein the context comprises a permit table of permitted mutation events;
wherein the instructions for monitoring user activity further comprise instructions for detecting a mutation event based on the user activity; and
wherein the instructions for detecting activity that violates the context further comprise instructions for determining that the mutation event is absent from the permit table.

20. The non-transitory computer-readable medium of claim 15, wherein the instructions for recording the one or more actions further comprise instructions for:
presenting a floating widget;
receiving a first indication, via the floating widget, to begin recording user activity; and
receiving a second indication, via the floating widget, to cease recording.

* * * * *